Dec. 31, 1940.  V. VALLETTA  2,226,790

METAL FRAMEWORK FOR MOTOR VEHICLES

Filed July 12, 1939  4 Sheets-Sheet 1

Fig. 4ᵃ

Fig. 4ᵇ

INVENTOR
VITTORIO VALLETTA

Dec. 31, 1940.     V. VALLETTA     2,226,790
METAL FRAMEWORK FOR MOTOR VEHICLES
Filed July 12, 1939     4 Sheets-Sheet 2
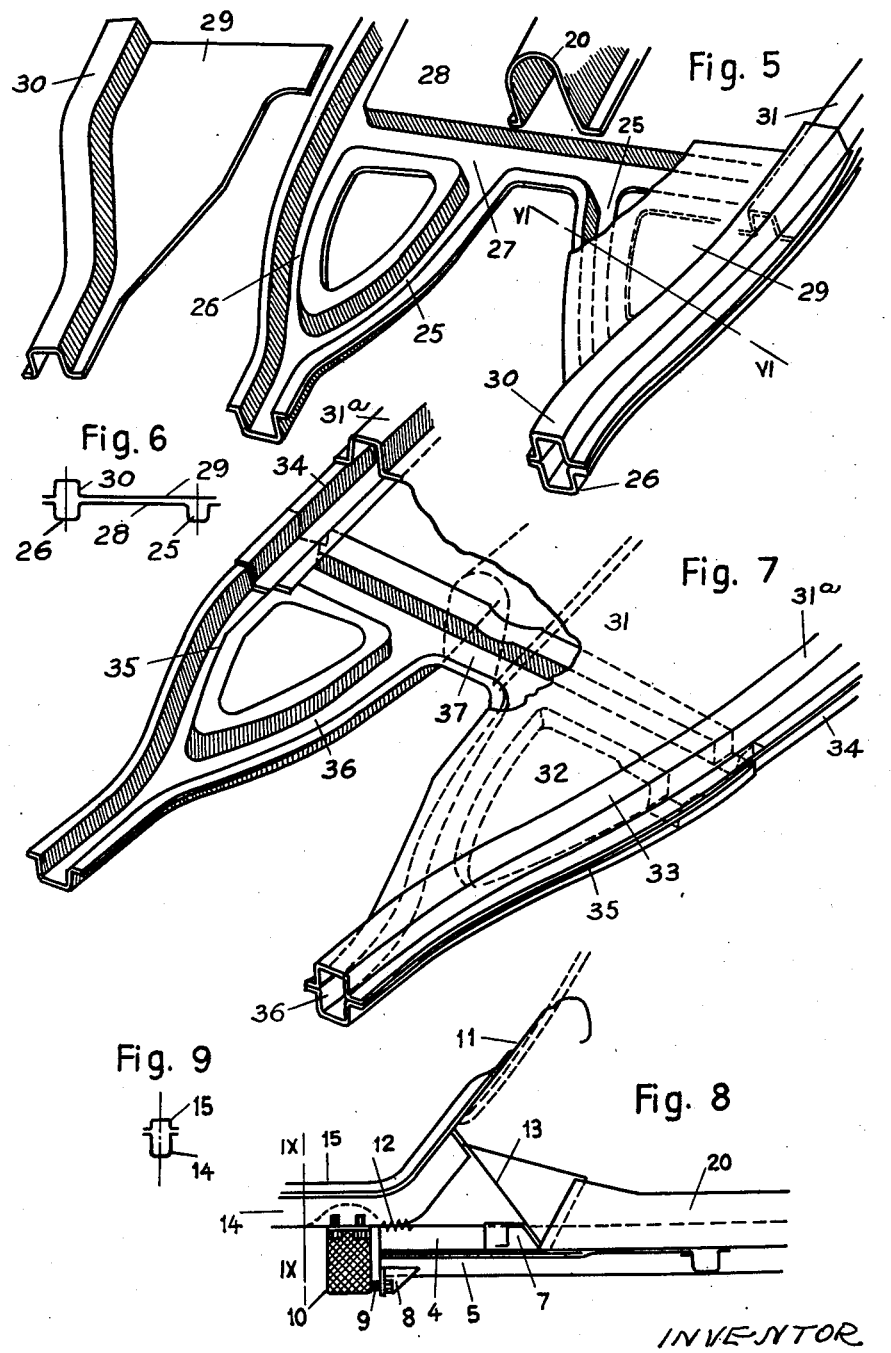
INVENTOR
VITTORIO VALLETTA

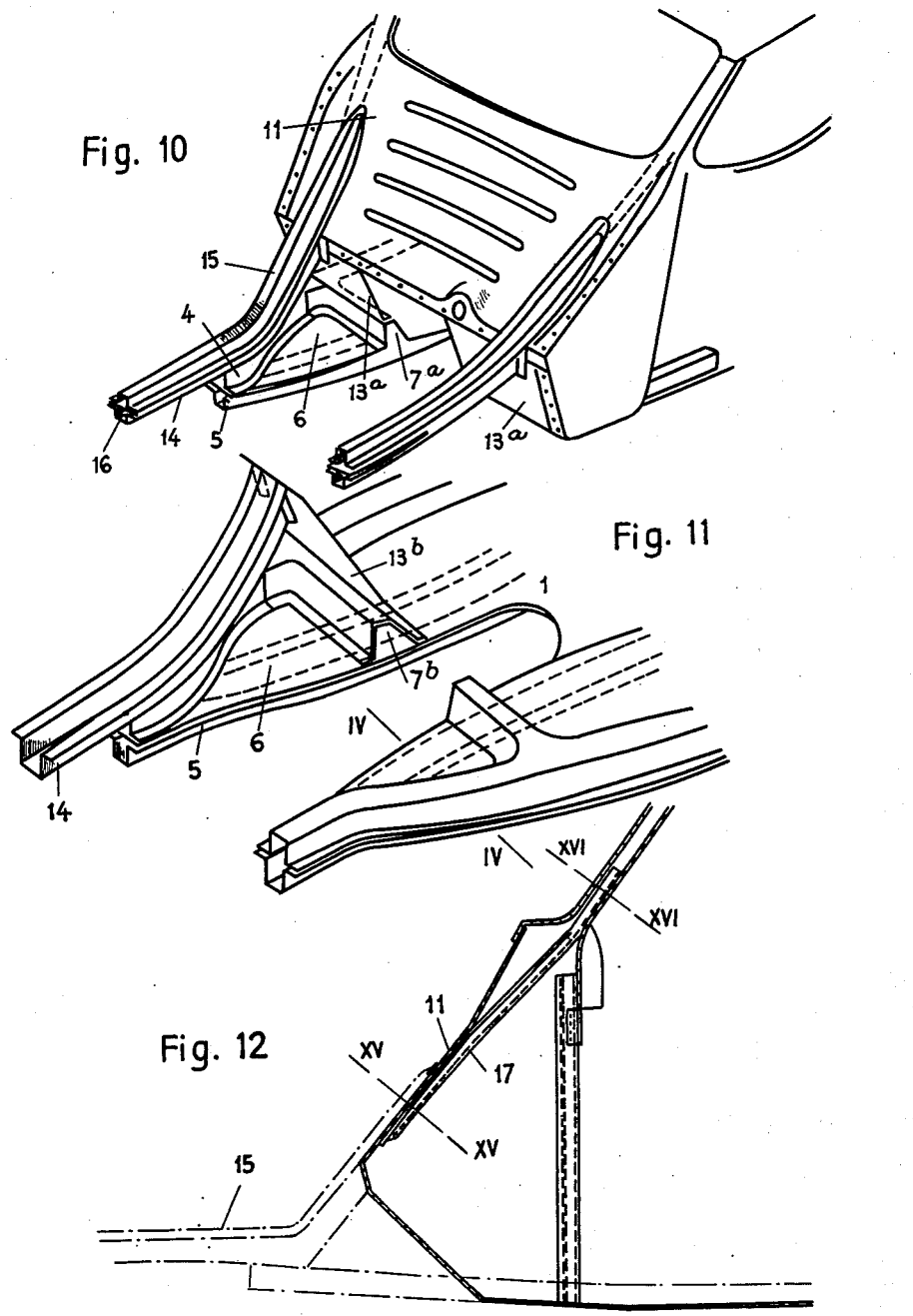

Dec. 31, 1940.　　　V. VALLETTA　　　2,226,790
METAL FRAMEWORK FOR MOTOR VEHICLES
Filed July 12, 1939　　　4 Sheets-Sheet 4
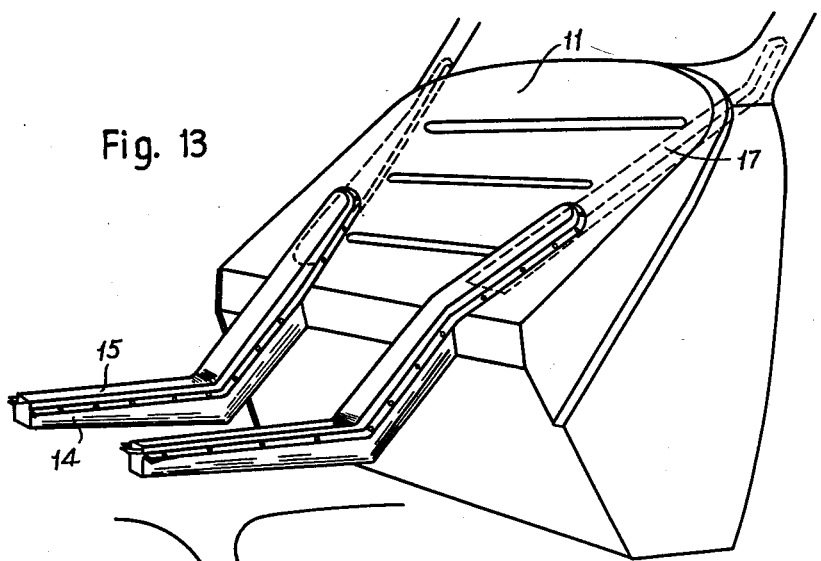
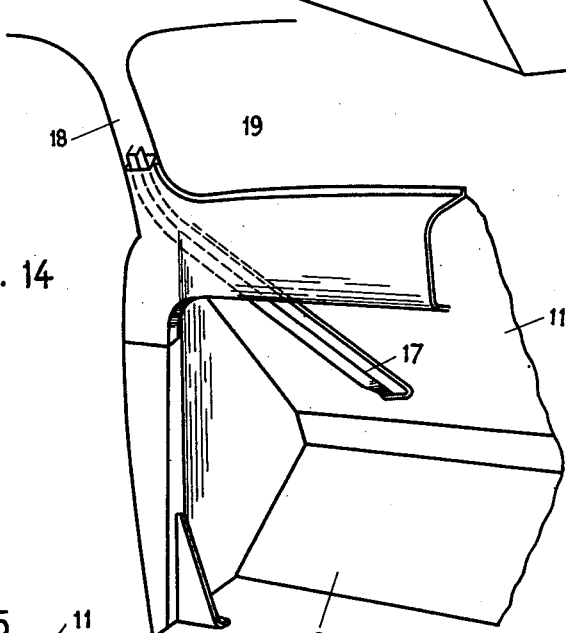
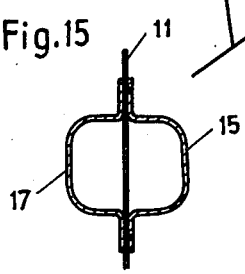
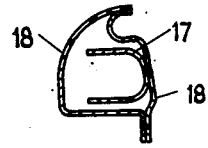
INVENTOR
VITTORIO VALLETTA.
By Woehauster & Groff
attys.

Patented Dec. 31, 1940

2,226,790

UNITED STATES PATENT OFFICE 2,226,790

METAL FRAMEWORK FOR MOTOR VEHICLES

Vittorio Valletta, Turin, Italy, assignor to Fiat Societa Anonima, Turin, Italy

Application July 12, 1939, Serial No. 284,109
In Italy February 7, 1939

11 Claims. (Cl. 296—28)

This invention relates to metal framework for motor vehicles more particularly for light motor vehicles in which the distance between the front axle and the foot board is comparatively small, of the kind in which a closed bottom frame of sheet metal having a hollow section rim is incorporated with a metal upper frame.

The invention has for its main object to ensure high rigidity and resistance in both the horizontal and vertical directions, as well as light weight and simple and cheap construction.

Framework comprising a closed bottom frame of sheet metal incorporated with an upper frame is already known, in which the rim of the bottom frame is of hollow section obtained by means of channels pressed out of the marginal regions of said bottom, said channels being closed by separately made reinforcing sheet pieces facilitating the fitting up of the pillars and sides of the body. Such means are also used in the improved framework according to the invention.

The improved framework is characterised in that two hollow brackets extend forward from the bottom frame on each side of its centre line, one of each two brackets extending from the rim at each side and the other from adjacent the centre line, and each two converging so that their front ends are disposed one above the other, two hollow struts extending from a dash plate in the upper frame being superposed on each two of said brackets and the front axle being secured to the brackets and struts.

The aforesaid struts are advantageously continued, from the level of the dash plate, by additional struts merging at their upper ends into the side pillars of the windscreen, whereby a very strong assembling of the lower and upper parts of the framework with the front axle is obtained.

Figure 1:
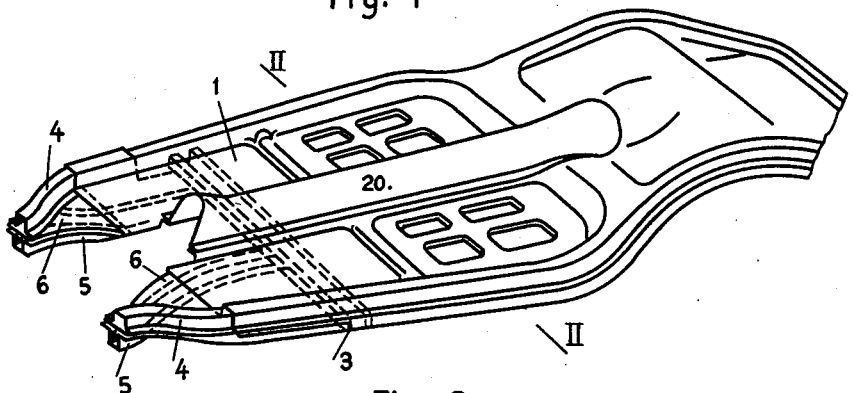
Figure 2:
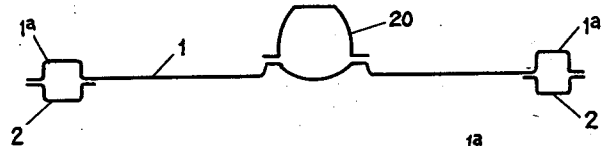
Figure 3:
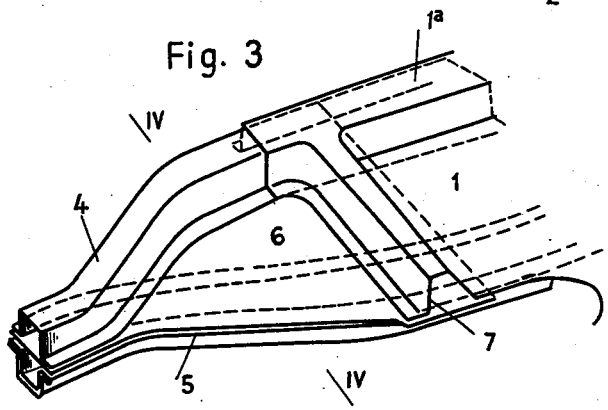
Figure 4:
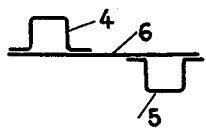
Figure 4:
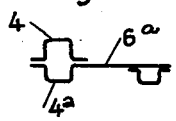
Figure 4:
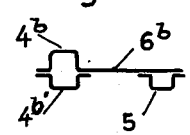

The foregoing and further features of the invention are illustrated by way of example in the attached drawings, which show diagrammatically some embodiments of the invention:

Fig. 1 being a perspective view of the bottom frame according to one embodiment, Fig. 2 a section on line II—II of Fig. 1, Fig. 3 a fragmentary view, on a larger scale, of a slightly modified front part, Fig. 4 a section on line IV—IV of Fig. 3, and Figs. 4a and 4b corresponding sections of modifications, Figs. 5 and 7 perspective views of two further modified forms of the front part of the bottom frame, Fig. 6 a section on line VI—VI of Fig. 5, Fig. 8 a longitudinal section of an assembly of bottom frame, dash plate, front axle, bottom brackets and struts, Fig. 9 a section on line IX—IX of Fig. 8, Fig. 10 a perspective view of the front part of the upper frame, and Fig. 11 a corresponding perspective view, partially sectioned, of a modified form on a larger scale, while Figs. 12 to 16 show the reinforcing system between the front axle and pillars of the wind screen; Fig. 12 being a longitudinal section; Fig. 13 a front perspective view; Fig. 14 a rear perspective view, partially sectioned, and Figs. 15 and 16 sections on lines XV—XV and XVI—XVI respectively of Fig. 12.

As shown in Figs. 1 and 2, the bottom frame 1 of the framework consists of a sheet metal member, from which are pressed out marginal channels 1a closed by separately made channel pieces 2, thus forming box spars extending the whole length of the bottom 1. A tunnel 20 for the transmission shaft is formed in known manner in the central part of the bottom 1. A sheet metal bracket 4, of U-section, is fitted into and welded to each channel 1a. On each side of the tunnel 20 a bracket 5 is welded to the lower surface of the front part of the bottom frame 1. The four brackets 4 and 5 are curved to S-form, so that the front ends of the two brackets on each side of the tunnel are superposed. Each two brackets 30 are fixed together by welding to a sheet metal plate 6 welded to the front end of the bottom frame 1 and forming an extension thereof. The brackets 4 and 5 and the plates 6 extend from a reinforcing crosspiece 3, which is also welded to the lower face of the bottom 1.

As shown in Fig. 3 a cross channel 7 is pressed out at the front part of the bottom 1 and may be complementary to or replace the welded on crosspiece 3.

In the modification shown in Fig. 4a, the outer bracket comprises an auxiliary channel 4a formed in the plate 6a, the open side of which is opposite the outer side of the bracket 4. In the modification shown in Fig. 4b, the outer bracket comprises a channel 4b formed in the plate 6b and an auxiliary channel 4b' opposite the channel 4b.

With a view to reducing the number of pieces to be welded to one another, it is more advantageous in practice to construct the brackets in one of the forms shown in Figs. 5 to 7, in which many of the above mentioned elements are united as a single member. As shown in Fig. 5, the two brackets 25 and two complementary channels 26 form with the cross channel 27 a structure which is integral with the bottom frame 28. On opposite sides of the central line, two plates 29 with the brackets 30 pressed out therefrom are secured to said frame by welding. The spars 31 applied to the bottom 28 are fitted into the channels 30. The arrangement shown in Fig. 7 is more economical, and has, moreover, the advantage of requiring less complicated press dies. In this case the bottom frame 31, the rim of which is provided with a channel 31a is integral with a bifurcated front plate 32 each part of which incorporates one of the brackets 33. On the lower surface of said piece are secured, by welding, the spars 34 at the rear of the channels 31a, and at the front of the frame a pressed sheet metal member extending the whole width of the frame and comprising the channels 35, brackets 36 and cross channel 37. The channels 35 are situated on the extension of the spars 34 and form with the extensions 33 of the channels 31a hollow brackets of large section.

It will be evident that within the scope of the invention it is possible to modify in many ways the front part of the bottom comprising the superposed bracket pairs, plate or plates and cross channel.

Whatever the particular construction of said members may be, the front axle bar 10 is fixed to the front ends of the superposed brackets, for instance, 4 and 5, as shown in Fig. 8, by means of angle bars 8 and bolts 9, and further by means of bolts to the under sides of two struts (one on each side) extending down from the dash plate 11. As represented in Fig. 8 by an undulating line 12, said struts are welded to the brackets 4. The dash plate 11 is connected to the upper cross channel 7 of the bottom frame by means of the foot plate 13, which fits the rear inclined face of said cross channel.

In the modified form according to Fig. 10, a flange on the lower edge of the foot plate 13a is welded to the top surface of the cross channel 7a, while Fig. 11 shows the lower edge of the plate 13b secured to the rear surface of a crosspiece 7b attached to the bottom frame 1 instead of a channel pressed out from said frame. In this manner a triangulated structure is obtained in both the vertical and horizontal planes, which is very rigid and resistant.

Each of the aforesaid struts is constituted by a lower channel member 14 of pressed sheet metal, welded to the upper margin of the foot plate 13, or 13a, or 13b at the region where it merges into the front web of the transversely arched dash plate 11, and an upper channel member 15 a length of which extends over said front web.

An additional strut 17 extends in continuation of each of the channel members 15, from the inner surface of the front web dash plate 11 below the attachment thereto of the said upper channel member 15, upwardly and towards the side of the upper frame, and fits into the side pillar 18 of the windscreen 19 (Fig. 14), which pillar is constituted in known manner by two shaped sheet metal members welded together by means of their flanges (see Fig. 16). The strut 17 is welded to one of the members forming the pillar so that a line of distribution of the stresses, starting from the front axle 10 and extending through the struts 14, 15 and 17, to the upper parts of the car, is obtained.

Evidently, the form and constructional details of the framework may be modified according to practical requirements without exceeding the scope of the invention.

What I claim is:

1. Framework for a motor vehicle comprising a closed bottom sheet member, a hollow section rim for said bottom member, two hollow brackets extending forward from the bottom member on each side of its centre line, one of each two brackets extending from said rim at each side and the other from adjacent the centre line and each two brackets converging so that their front ends are disposed one above the other, an upper frame, a dash plate on said upper frame, two hollow struts extending from said dash plate and superposed one on each two of said brackets and a front axle bar fitted to the brackets and struts.

2. Framework for a motor vehicle, comprising a bottom sheet member, a hollow section rim for said bottom member, a reinforcing crosspiece pressed out from said bottom member, two hollow brackets extruding forward from said reinforcing crosspiece on each side of its centre line, one of each two brackets extending from said rim at each side and the other from adjacent the centre line and each two brackets converging so that their front ends are disposed one above the other, an upper frame, a dash plate on said upper frame, two hollow struts extending from said dash plate and superposed one on each two of said brackets and a front axle bar fitted to the brackets and struts.

3. Framework for a motor vehicle, comprisprising a closed bottom sheet member, a hollow section rim for said bottom member, a reinforcing crosspiece pressed out from said bottom member, a plate attached to and forming a front extension of the bottom member, two hollow brackets extending forward from the said reinforcing crosspiece and fixed to the said plate, one of each two brackets extending from said rim at each side and the other from adjacent the centre line and each two brackets converging so that their front ends are disposed one above the other, an upper frame, a dash plate on said upper frame, two hollow struts extending from said dash plate and superposed one on each two of said brackets and a front axle bar fitted to the brackets and struts.

4. Framework for a motor vehicle comprising a closed bottom sheet member, hollow section rims for said bottom member, a reinforcing crosspiece pressed out from said bottom member, outer brackets extending forwardly from said reinforcing crosspiece at the said rims, inner brackets extending forward from adjacent the centre line, the inner and outer brackets at each side of the centre line converging so that at their front ends they are disposed one above the other, said brackets on each side being formed by an outer channel, an auxiliary channel arranged underneath said outer channel, an inner channel and a plate connecting said channels and forming an extension of the bottom member, an upper frame, a dash plate on said upper frame, two hollow struts extending from said dash plate and superposed one on each two of said brackets, and a front axle bar fitted to the brackets and struts.

5. Framework as claimed in claim 4, wherein the inner pair of channels and reinforcing crosspiece are pressed out of a common piece at the front end of the bottom member.

6. Framework as claimed in claim 4, wherein the inner pair of channels and the auxiliary channels and the crosspiece are pressed out of a common piece which comprises the front end of the bottom member.

7. Framework as claimed in claim 4, wherein the outer pair of channels and the front extension plate are pressed out of a common piece at the front end of the bottom member.

8. Framework, as claimed in claim 4, wherein the front extension plate and the outer channels are integral with the bottom frame, while the inner channels, the auxiliary channels of the outer channels and the reinforcing crosspiece are formed in another member extending the whole width of said frame and attached by welding thereto.

9. Framework for a motor vehicle, comprising a bottom closed sheet member, hollow section rims for said bottom member, a reinforcing crosspiece pressed out from said bottom member, outer brackets extending forward from said reinforcing crosspiece at the same rims, inner brackets extending forward from adjacent the centre line, the inner and outer brackets at each side of the centre line converging so that at their front ends are disposed one above the other, said brackets on each side being constituted by an outer channel, an auxiliary channel arranged underneath said outer channel, an inner channel and a plate connecting said channels and forming an extension of the bottom member, an upper frame, a dash plate on said upper frame, two hollow struts extending from said dash plate and superposed one on each two of said brackets, each one of said hollow struts being formed by two channel pieces the hollow faces of which are opposed, the lower channel piece being welded to one of the brackets, a foot plate fixed to the said lower channel near its connection with the dash plate, while a length of said upper channel piece extends over and is welded to the said dash plate.

10. Framework as claimed in claim 9, wherein the foot plate is welded at its lower edge to the reinforcing crosspiece of the bottom frame to form with the brackets and struts a triangular resistant structure.

11. Framework, as claimed in claim 9, comprising additional struts which extend, in continuation of the upper channel pieces, from adjacent the lower edge of the dash plate, said additional struts being fitted, each at its upper part, into one of the side pillars of the windscreen.

VITTORIO VALLETTA.